(12) United States Patent
Rastogi et al.

(10) Patent No.: US 12,579,482 B2
(45) Date of Patent: Mar. 17, 2026

(54) SCHEMA-GUIDED RESPONSE GENERATION

(71) Applicant: Google LLC, Mountain View, CA (US)

(72) Inventors: Abhinav Kumar Rastogi, Sunnyvale, CA (US); Raghav Gupta, Mountain View, CA (US); Xiaoxue Zang, Santa Clara, CA (US); Srinivas Kumar Sunkara, Mountain View, CA (US); Pranav Khaitan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 483 days.

(21) Appl. No.: 18/152,553

(22) Filed: Jan. 10, 2023

(65) Prior Publication Data

US 2023/0162098 A1 May 25, 2023

Related U.S. Application Data

(63) Continuation of application No. 16/724,604, filed on Dec. 23, 2019, now Pat. No. 11,551,159.

(51) Int. Cl.
*G06F 40/20* (2020.01)
*G06F 9/54* (2006.01)
(Continued)

(52) U.S. Cl.
CPC ............... *G06Q 10/02* (2013.01); *G06F 9/54* (2013.01); *G06F 16/211* (2019.01);
(Continued)

(58) Field of Classification Search
CPC .......... G06Q 10/02; G06Q 50/40; G06F 9/54; G06F 16/211; G06F 16/243; G06F 40/20; G06F 40/30; G06N 20/00; G06N 3/045
See application file for complete search history.

(56) References Cited

U.S. PATENT DOCUMENTS 9,548,050 B2      1/2017   Gruber et al.
10,951,552 B2 *   3/2021   Jafar Ali ............... G06F 40/295
(Continued)

FOREIGN PATENT DOCUMENTS

WO        2019074509        4/2019

OTHER PUBLICATIONS

Bapna et al., "Towards Zero-Shot Frame Semantic Parsing for Domain Scaling", arXiv:1707v1, Jul. 7, 2017, 5 pages.
(Continued)

*Primary Examiner* — Fariba Sirjani
(74) *Attorney, Agent, or Firm* — DORITY & MANNING P.A.

(57) ABSTRACT

Generally, the present disclosure is directed to systems and methods for performing task-oriented response generation that can provide advantages for artificial intelligence systems or other computing systems that include natural language processing for interpreting user input. Example implementations can process natural language descriptions of various services that can be accessed by the system. In response to a natural language input, systems can identify relevant values for executing one of the service(s), based in part on comparing embedded representations of the natural language input and the natural language description using a machine learned model.

20 Claims, 8 Drawing Sheets

(51) Int. Cl.

| | |
|---|---|
| *G06F 16/21* | (2019.01) |
| *G06F 16/242* | (2019.01) |
| *G06N 20/00* | (2019.01) |
| *G06Q 10/02* | (2012.01) |
| *G06Q 50/40* | (2024.01) |

(52) U.S. Cl.

CPC ............ *G06F 16/243* (2019.01); *G06F 40/20* (2020.01); *G06N 20/00* (2019.01); *G06Q 50/40* (2024.01)

(56) References Cited

U.S. PATENT DOCUMENTS

| | | | |
|---|---|---|---|
| 11,551,159 B2* | 1/2023 | Rastogi | G06F 16/211 |
| 2016/0202957 A1 | 7/2016 | Siddall et al. | |
| 2017/0091171 A1* | 3/2017 | Perez | G06F 40/35 |
| 2019/0132264 A1* | 5/2019 | Jafar Ali | G06F 40/295 |
| 2019/0370615 A1* | 12/2019 | Murphy | G06F 9/541 |
| 2020/0042642 A1 | 2/2020 | Bakis et al. | |
| 2020/0042649 A1* | 2/2020 | Bakis | H04L 51/02 |
| 2020/0192727 A1* | 6/2020 | Savenkov | G06F 9/547 |
| 2020/0320988 A1* | 10/2020 | Rastogi | G10L 15/22 |
| 2020/0334730 A1 | 10/2020 | Westlake et al. | |
| 2021/0117624 A1* | 4/2021 | Aghajanyan | G06F 40/56 |
| 2021/0182126 A1 | 6/2021 | Walters et al. | |
| 2021/0182497 A1* | 6/2021 | Mullins | G06F 40/30 |
| 2021/0249001 A1* | 8/2021 | Cao | G10L 15/16 |

OTHER PUBLICATIONS

Budzianowski et al., "Multiwoza Large-Scale Multi-Domain Wizard-of-Oz Dataset for Taskoriented Dialogue Modelling", arXiv:1810v3, Apr. 20, 2020, 14 pages.
Chao et al., "BERT-DST: Scalable End-to-End Dialogue State Tracking with Bidirectional Encoder Representations from Transformer", arXiv:1907v1, Jul. 5, 2019, 5 pages.
Devlin et al., "Bert: Pre-Training of Deep Bidirectional Transformers for Language Understanding", arXiv:1810v2, May 24, 2019, 16 pages.
El Asri, ". Frames: A Corpus for Adding Memory to Goal-Oriented Dialogue Systems", arXiv:1704v2, Apr. 13, 2017, 17 pages.
Eric. "Multiwoz 2.1: Multi-Domain Dialogue State Corrections and State Tracking Baselines", arXiv:1907v4, Dec. 3, 2019, 7 pages.
Goel, ". HyST: A Hybrid Approach for Flexible and Accurate Dialogue State Tracking", arXiv:1907v1, Jul. 1, 2019, 5 pages.
Hemphill et al., ". The ATIS Spoken Language Systems Pilot Corpus", Proceedings of a Workshop Held at Hidden Valley, Pennsylvania, United States, Jun. 24-27, 1990, pp. 96-101.

Henderson et al., "The Second Dialog State Tracking Challenge", Fifteenth Annual Meeting of the Special Interest Group on Discourse and Dialogue (SIGDIAL), Philadelphia, Pennsylvania, United States, Jun. 2014, 263-272.
Henderson et al., "The Third Dialog State Tracking Challenge", Spoken Language Technology Workshop, 2014, pp. 324-329.
Henderson et al., "Wordbased Dialog State Tracking with Recurrent Neural Networks", Fifteenth Annual Meeting of the Special Interest Group on Discourse and Dialogue, Philadelphia, Pennsylvania, United States, Jun. 2014, pp. 292-299.
Hendrycks et al., Gaussian Error Linear Units (GELUS), arXiv:1606v3, Nov. 11, 2018, 9 pages.
Kelley, "An Iterative Design Methodology for User-Friendly Natural Language Office Information Applications", Transactions on Information Systems, vol. 2, Issue 1, Jan. 1984, pp. 26-41.
Kim et al., "The Fourth Dialog State Tracking Challenge", Dialogues with Social Robots, 2016, pp. 435-449.
Kim et al., "Efficient Large-Scale Neural Domain Classification with Personalized Attention", Fifty-sixth Annual Meeting of the Association for Computational Linguistics, Melbourne, Australia, Jul. 2018, pp. 2214-2224.
Mikšić et al., "Neural Belief Tracker: Data-Driven Dialogue State Tracking", arXiv:1606v2, Apr. 21, 2017, 12 pages.
Peters et al., "Deep Contextualized Word Representations", arXiv:1802v2, Mar. 22, 2018, 15 pages.
Rastogi et al., "Multitask Learning for Joint Language Understanding and Dialogue State Tracking", arXiv:1811vl, Nov. 13, 2018, 9 pages.
Rastogi et al., "Scalable Multi-Domain Dialogue State Tracking", arXiv:1712v2, Jan. 2, 2018, 8 pages.
Shah et al., "Building a Conversational Agent Overnight with Dialogue Self-Play", arXiv:1801v1, Jan. 15, 2018, 11 pages.
Shah et al., "Robust Zero-Shot Cross-Domain Slot Filling with Example Values", arXiv:1906v1, Jun. 17, 2019, 7 pages.
Wen et al., "A Network-Based End-to-End Trainable Task-Oriented Dialogue System", Fifteenth Conference of the European Chapter of the Association for Computational Linguistics, Valencia, Spain, vol. 1, Apr. 2017, p. 438-449.
Williams et al., "The Dialog State Tracking Challenge", SIGDIAL 2013 Conference, Metz, France, Aug. 2013, pp. 404-413.
Wu et al., "Transferable Multi-Domain State Generator for Task-Oriented Dialogue Systems", arXiv:1905v2, May 26, 2019, 12 pages.
Xia et al., "Zero-Shot User Intent Detection via Capsule Neural Networks", arXiv:1809v1, Sep. 2, 2018, 10 pages.
Yang et al., ". Transfer Learning for Sequence Tagging with Hierarchical Recurrent Networks", arXiv:1703v1, Mar. 18, 2017, 10 pages.
Zhang et al., "Global-Locally Self-Attentive Encoder for Dialogue State Tracking", Fifty-sixth Annual Meeting of the Association for Computational Linguistics, Melbourne, Australia, Jul. 2018, vol. 1, pp. 1458-1467.

* cited by examiner

500

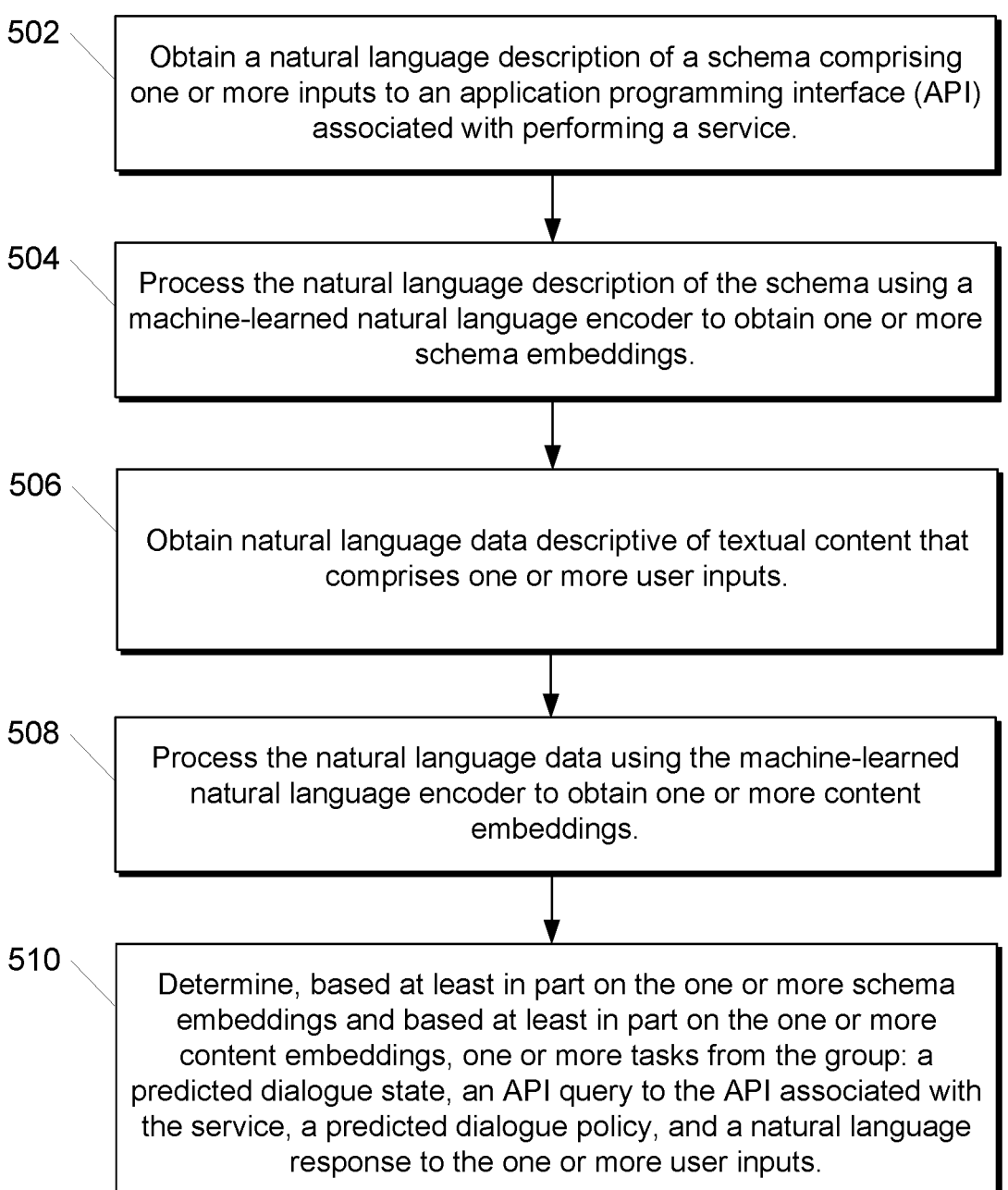

502 Obtain a natural language description of a schema comprising one or more inputs to an application programming interface (API) associated with performing a service.

504 Process the natural language description of the schema using a machine-learned natural language encoder to obtain one or more schema embeddings.

506 Obtain natural language data descriptive of textual content that comprises one or more user inputs.

508 Process the natural language data using the machine-learned natural language encoder to obtain one or more content embeddings.

510 Determine, based at least in part on the one or more schema embeddings and based at least in part on the one or more content embeddings, one or more tasks from the group: a predicted dialogue state, an API query to the API associated with the service, a predicted dialogue policy, and a natural language response to the one or more user inputs.

Figure 5

SCHEMA-GUIDED RESPONSE GENERATION

PRIORITY CLAIM

This application is a continuation of U.S. application Ser. No. 16/724,604 having a filing date of Dec. 23, 2019. Applicant claims priority to and the benefit of U.S. application Ser. No. 16/724,604 and incorporates this application herein by reference in its entirety.

FIELD

The present disclosure relates generally to natural language processing. More particularly, the present disclosure relates to computer-implemented systems and methods which can process natural language descriptions of application services and natural language descriptions of user inputs to determine a system response. Aspects of the present disclosure can further include processing the natural language descriptions to generate embeddings and using the embeddings to determine the system response which can include a dialogue state.

BACKGROUND

Today's virtual assistants (e.g., an artificial intelligence-based software agent) help users to accomplish a wide variety of tasks, including finding flights, searching for nearby events and movies, making reservations, sourcing information from the web and more. They provide this functionality by offering a unified natural language interface to a wide variety of services across the web.

In particular, the recent popularity of conversational interfaces and the advent of frameworks like Actions on Google and Alexa Skills, which allow developers to easily add support for new services, has resulted in a major increase in the number of application domains and individual services that virtual assistants need to support.

The increase in the number of services these devices must support as well as the dynamic introduction of new services has led to a need to generate scalable dialogue systems that can handle tasks across multiple application domains. Further, there is a need for these systems to anticipate or otherwise work with possibly unseen services without undue burden to system resources.

Data-driven, deep learning-based approaches for multi-domain modeling have shown some promise, both for end-to-end and modular systems involving dialogue state tracking and policy learning. However, there are still unresolved issues for incorporating new domains or updating existing services without needing to retrain current models. Still needed are robust approaches for response generation that can scale to new services and service updates.

SUMMARY

Aspects and advantages of embodiments of the present disclosure will be set forth in part in the following description, or can be learned from the description, or can be learned through practice of the embodiments.

Generally, the present disclosure is directed to systems and methods for performing task-oriented response generation that can provide advantages for artificial intelligence systems or other computing systems that include natural language processing for interpreting user input. Example implementations can process natural language descriptions of various services that can be accessed by the system. In response to a natural language input, systems can identify relevant values for executing one of the services, based in part on providing representations of the natural language input and the natural language description to a machine learned model.

One example aspect of the present disclosure is directed to systems including models such as natural language encoders that can receive a natural language input and output an embedding based on the natural language input.

Another example aspect of the present disclosure is directed to determining a system task (e.g., a predicted dialogue state, an API query to an API associated with the service, a predicted dialogue policy, and/or a natural language response) based at least in part on an output of the natural language encoder. For instance, the natural language encoder can be configured to generate one embedding from a user input (e.g., a request to use a service) and a second embedding generated from the natural language description of a service (e.g., a description of a function of the service). A machine learned model (e.g., a neural network) can receive both embeddings as input to determine one or more system tasks.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

A brief description of the drawings is provided below, and detailed discussion of embodiments directed to one of ordinary skill in the art is set forth in the specification, which makes reference to the appended figures, in which:

FIG. 3 depicts an alternate input displaying a schema and user input provided to the dialogue state model to determine output data.

FIG. 5 depicts a flow chart displaying an example method according to example implementations of the present disclosure.

DETAILED DESCRIPTION

Overview

Figure 1A:
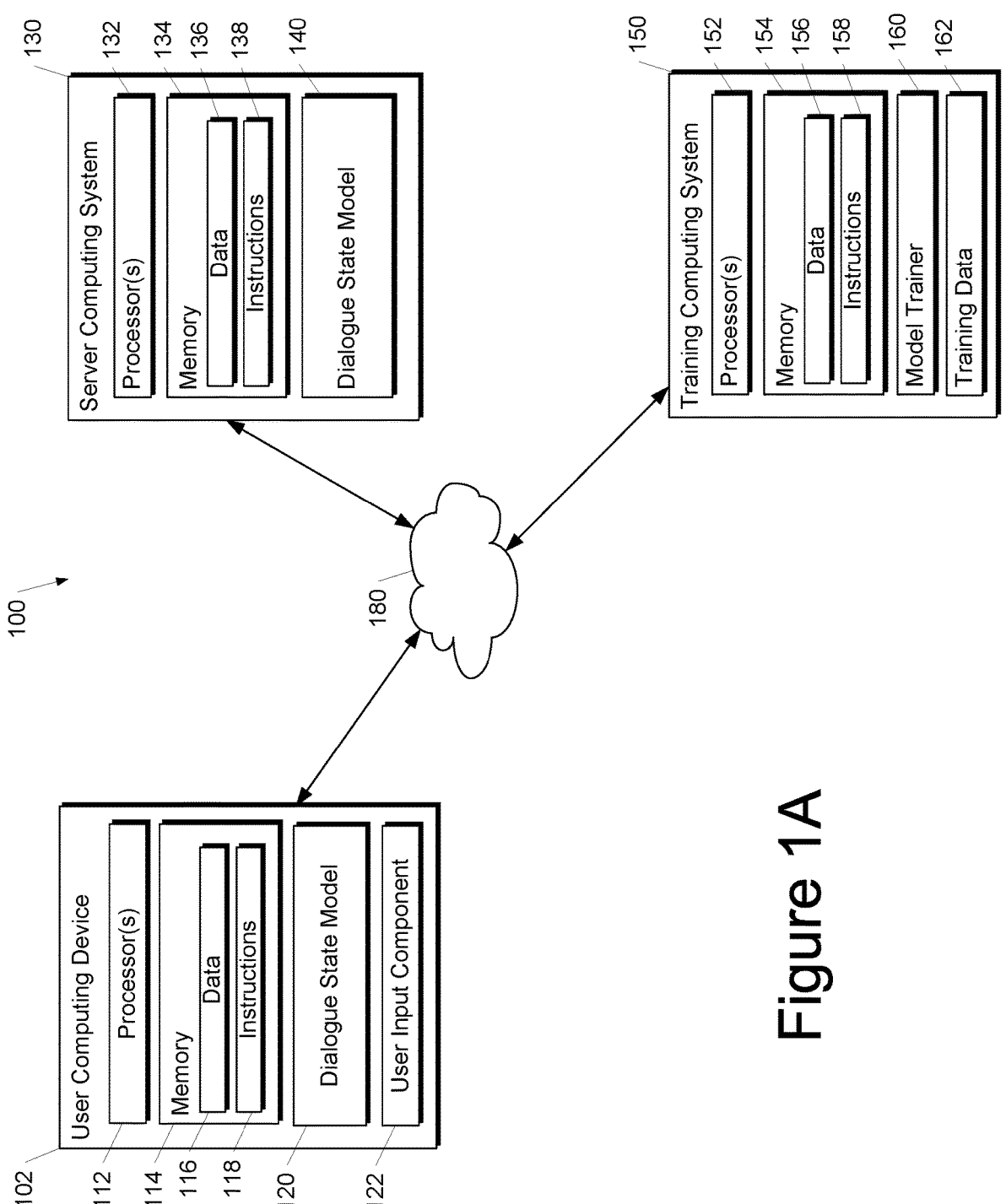
FIG. 1A depicts an example computing system according to example implementations of the present disclosure.

Generally, the present disclosure provides systems and methods for performing task-oriented response generation that can provide advantages for artificial intelligence systems or other computing systems that include natural language processing for interpreting user input. In particular, aspects of the present disclosure are directed to a schema-guided approach for building virtual assistants. Example implementations of the proposed approach enable utilization of a single model across multiple disparate services and domains, with no domain-specific parameters.

The proposed schema-guided approach builds on the power of pre-trained language models like BERT. In particular, in some implementations, a pre-trained language model can be used to generate schema embedding(s) for natural language description(s) of a schema for one or more inputs to an application programming interface (API) associated with performance of a service. Similarly, the language model can be used to generate content embedding(s) for natural language content associated with user input(s) (e.g., text entered into the dialogue by a user). A computing system can perform various dialogue tasks based at least in part on the one or more schema embeddings and/or the one or more content embeddings. As examples, the tasks can include determining: a predicted dialogue state, an API query to the API associated with the service, a predicted dialogue policy, and/or a natural language response to the user input(s) based on the embedding(s).

In contrast to the proposed embedding-based approach, one common approach to training virtual assistants to support the diversity of services available on the web requires a large master schema that lists all supported functions and their parameters. However, it is difficult to develop a master schema catering to all possible use cases. Even if that problem is solved, a master schema would complicate integration of new or small-scale services and would increase the maintenance workload of the assistant. Furthermore, while there are many similar concepts across services that can be jointly modeled, for example, the similarities in logic for querying or specifying the number of movie tickets, flight tickets or concert tickets, the master schema approach does not facilitate joint modeling of such concepts, unless an explicit mapping between them is manually defined.

The new schema-guided approach proposed herein addresses these limitations. This approach does not require the definition of a master schema for the assistant. Instead, in some implementations, each service or API provides a natural language description of the functions listed in its schema along with their associated attributes. These descriptions can then be used to learn a distributed semantic representation of the schema (e.g., a schema embedding), which can be given as an additional input to the dialogue system. The dialogue system can then be implemented as a single unified model, containing no domain or service specific parameters. This unified model facilitates representation of common knowledge between similar concepts in different services, while the use of distributed representations of the schema makes it possible to operate over new services that are not present in the training data.

More particularly, an example computing system can include or have access to one or more remote or local applications or services which have application programming interfaces (APIs) that provide protocols for performing or requesting performance of a function or service. The example computing system can include a virtual assistant which can interact with a user via a dialogue (e.g., a textual or verbal dialogue). As part of engaging in the dialogue, the virtual assist (and/or an associated computing system) can perform operations to guide response generation. Response generation can include identifying and/or performing the function or service offered by one of the remote or local applications or services. In order to identify or perform such services, the virtual assistant may interact with the remote or local application or service via a pre-defined API associated with the application or service.

However, according to an aspect of the present disclosure, the virtual assistant may not need to be explicitly programmed to handle communications according to such APIs. Instead, a schema-guided approach can be employed in which a virtual assistant (or other dialogue system) operates on distributed semantic representations (e.g., embeddings) of the schema of the API generated by a natural language encoder model from natural language descriptions of the schema of the API.

Thus, in some implementations, to facilitate interaction by the virtual assistant with a remote or local function or service, a computing system (e.g., the system implementing the virtual assistant) can obtain information related to the APIs of the function or service, such as a schema for the inputs to the API. Specifically, in some implementations the information can include a natural language (NL) description of the function/service as well as natural language description(s) of any input(s) for performing the function/service and/or the schema itself. The system can also include components and/or instructions for obtaining a user input (e.g., a request to book a flight), in the form of a natural language (NL) description. The example system can process some or all of the schema NL descriptions as well as the user NL description from the user input using a natural language encoder to obtain one or more schema embeddings and one or more content embeddings, respectively. Based at least on one or both sets of embeddings (schema and content), the system can determine a next action.

Thus, the NL descriptions of the schema can be used to guide actions of example systems for generating a response to the user input. In generating the response, example systems may utilize a machine learned model to execute one or more tasks such as determining a predicted dialogue state, generating an API query to the API associated with the service, determining a predicted dialogue policy, or generating a natural language response to the one or more user inputs. In this manner, systems and methods according to the present disclosure are robust and can be used in combination with a variety of applications that can include multiple schema having different numbers of inputs.

Example implementations of the present disclosure can realize these advantages using a single model configured to determine a response based on paring embedded representations of system natural language descriptions with embedded representations of natural language inputs, rather than using an individually trained model for each service. Additionally, by not using models that are trained individually for each service, implementations are robust to updates in services and need not be retrained when a service is modified (e.g., to change the inputs) as well as the addition of new services. Thus, example implementations of the present disclosure enable "zero-shot" dialogue tasks to be performed on previously un-seen application or service APIs.

As an example for illustration, a user trying to book a flight using an example device may prompt the device "find direct round trip flights from Baltimore to Seattle." The device can process the user prompt to generate a content embedding and obtain a schema associated with performing a travel booking service. The schema may include one or more inputs that are each associated with a natural language description of the respective input. The device can also process the schema to generate a schema embedding and provide both the schema embedding and the content embedding to a trained model in accordance with the present disclosure.

Based at least in part on the schema embedding and/or the content embedding, the device can determine the dialogue state which can include assigning values to the one or more inputs. The device may also provide the one or more inputs assigned by the model to the API to cause the API to attempt to execute the service and/or provide application response data that can be used to determine a device policy or device response. The device response can include accessing natural language descriptions of available actions that may be processed by a natural language generator, alone or in combination with the device policy, to output a natural language response. The natural language response can be provided as audio using a speaker in communication with the device. Every user prompt may not fulfill all of the inputs or other requirements for executing the service. In such cases, the device may continue to update the dialogue state by requesting a second user prompt. Example systems can process the second user prompt and/or additional user prompts to create subsequent embeddings that can be stored or aggregated. In this manner, example devices can be used to perform task-oriented response generation by predicting a current state for performing the task using system level descriptions in combination with user input(s).

More particularly, implementations according to the present disclosure can utilize a model configured to predict some or all elements of the schema based on natural language descriptions associated with the elements and in combination with natural language input received by the system (such as user input). As one example, a schema can include at least the following elements: a set of intents, a set of inputs, and a set of values that can be taken by the inputs and/or the intents. In predicting the elements of the schema, the model can determine probability distributions for assigning values from the set of values to certain inputs and/or certain intents. These probability distributions can be referred to as an active intents parameter which can define the current action preformed by the system (e.g., determining a departure date for a flight booking services), a requested inputs parameter which can define available inputs from the set of one or more inputs, and a user goals parameter which can define values assigned to available inputs.

In certain implementations, only one active intent may be available for any one service and so the active intent parameter may be omitted or may be determined at an application/API level. Thus, in some implementations, the model may only be configured to determine the requested inputs parameter and the user goal parameter. Alternatively, for certain implementations, a service may include multiple intents for which the active intent parameter can be predicted.

Aspects of the requested inputs parameter can include the subset of inputs with values provided in the current user prompt (e.g., flying out May 16 and returning May 20). While the user prompt generally includes values, these values may be related to inputs included in the schema using the machine-learned model and so embedded representations of both the user prompt and the schema can be used to determine probability distributions for possible inputs requested by the current user input as well as possible values for said inputs.

Aspects of the user goal parameter can include the set of all constraints/inputs specified till the current user prompt (e.g., booking a flight; departing Baltimore May 16; arriving Seattle; returning Baltimore May 20). Thus, as one example scenario, the user goal parameter can be determined based on predicting the difference in the user goal at the previous dialogue state and the current dialogue state. Example implementations can accumulate user goal updates to determine the predicted user goal parameter.

Convergence of user goal updates and/or a system response indicating that the service can be executed by the API may be used to provide a signal indicating that the model can select a terminating natural language description. This information can be provided to a natural language decoder to generate a natural language response from the device to a user (e.g., "ok, found several flights with prices between 300 to 500 dollars").

As another example, based on the model predictions, the system may determine a policy response that includes requesting a value for a schema input (e.g., a schema input that has not been assigned or that the assigned value should change). In this case, the system may access a policy selector to determine a policy response indicating the unassigned and/or incorrect input. The policy response can be provided to a natural language generator for generating a natural language response that would be understood by a person. The system may then relay the natural language response as audio for the user (e.g., "what day would you like to depart?").

In some implementations, the model may be configured to predict additional distributions used to assist in assigning values to certain inputs and/or intents in the case of multiple intents. As one example, determining the user goal parameter can include assigning a status to each of the inputs included in the schema and, determining a value for the input based on the input status. Example trained models for assigning an input status can be configured to predict whether an input should remain unchanged based on the current user prompt, whether an input is unnecessary based on the active intent, or whether a value should be predicted and assigned to the input. For implementations where a value should be predicted for an input, the model can be configured to determine logits based on the current content embedding (e.g., the embedding produced from processing the current user prompt) and the schema embedding. In some of these implementations, the schema embedding may be limited to the embedding for the natural language description associated with the input for which a value is currently being predicted.

In general, example devices can access various applications for a wide variety of services including weather forecast, travel booking, playing music, and other domain areas. Upon receiving a user prompt, the device can convert the audio signal into data that can be processed by the system to generate an output such as performing a task. While the user providing the prompt may only understand voice responses from the device, it should be understood that implementations more generally operate to perform task-oriented response generation, which can include predicting a dialogue state, an API query to the API associated with the service, a predicted dialogue policy, and/or a natural language response.

Example implementations according to the present disclosure can include operations that may be executed on computing devices. The computing devices may include features such as artificial intelligence assistants that can or can access a plurality of applications through associated APIs. Each of the APIs can be configured to perform functions/services based on the receipt of one or more inputs. Since each API can perform one or more services, each service may be associated with a schema defining one or more inputs for performing the service associated with the schema. Example devices can also include natural language processing engines that can process a natural language input such as a user prompt or a text description to produce one or more embeddings according to example methods disclosed herein. Based on the embeddings, example devices may further utilize trained models to track dialogue state and/or predict device policy.

One example implementation according to the present disclosure includes a computer implemented method for performing task-oriented response generation. Aspects of the method can include: obtaining a natural language description of a schema. Generally, the schema can define one or more inputs to an application programming interface (API) associated with performing a service. Each of the one or more inputs can have a respective natural language description. Additionally, the schema as a whole may have a general natural language description that may include one or more keywords that may be used to identify the service based on an initial user request.

In particular, obtaining the natural language description of the schema can be performed for one or more schemas. For example, methods can also include obtaining a natural language description of a second schema. The natural language description of the second schema can be different or the same as the natural language description of the schema. Further the natural language description of the second schema can define one or more second inputs to the same API or to a second application programming interface (API), the second schema associated with performing a second service.

The method can also include processing the natural language description of the schema and/or the second schema to obtain one or more schema embeddings and/or second schema embeddings. Since the schema are each associated a service that can be performed by an example system (e.g., by providing one or more inputs to an API), the schema embeddings may be obtained each time the method is executed by the system. Alternatively, schema embeddings may be generated for each application and stored for later access.

Aspects of obtaining the natural language description of the schema can include determining or selecting a schema from a group of schemas. For instance, the method may determine the schema to obtain or the schema embedding to obtain based at least in part on receiving natural language data descriptive of textual content from one or more user inputs. Thus, the example method can further include obtaining natural language data such as a voice recording (e.g., a user prompt).

The method can process natural language data using the machine-learned natural language encoder to obtain one or more content embeddings. Based at least in part one the one or more content embeddings and the one or more schema embeddings, the method can also include determining one or more tasks such as: a predicted dialogue state, an API query to the API associated with the service, a predicted dialogue policy, and a natural language response to the one or more user inputs.

For certain implementations, determining the predicted dialogue state can include at least determining a user intent defining one or more goals, where each of the goals is associated with at least one input of the one or more inputs defining the schema. Since implementations according to the present disclosure can include a plurality of services each associated with a respective schema, the user intent may be determined solely from inputs associated with a first schema or in combination with second inputs associated with a second schema. In this manner, determining the predicted dialogue state can include determining a schema from a group of one or more schemas. For instance, the machine-learned model can output logits for assigning a value to one of the one or more inputs, one of the one or more second inputs, or both. Based on the logits, the model may assign values only to inputs associated with the first schema or second inputs associated with the second schema. Further, implementations may track the predicted dialogue state or updates to the predicted dialogue state by saving or otherwise recording the value(s) assigned to the one or more inputs or the one or more second inputs.

Additionally or alternatively, for some implementations, the method can include generating the API query to the API associated with the service or the second service based at least on the predicted dialogue state. As an example, the predicted dialogue state can include values assigned to some threshold selection of the one or more inputs and/or the one or more second inputs. Example thresholds can include an assigned value to one input, assigned values to all required inputs (e.g., certain inputs), or assigned values to all inputs. Generating the API query can also include logic and/or syntax derived from the API for performing the service by providing the assigned values associated with the inputs to the API. In this manner, the predicted dialogue state can be used generate an API query.

In some implementations, the method may further include submitting the API query to the API associated with the service or the second service. Aspects of submitting the API query can include receiving a dataset that includes a response from the API associated with the service or the second service. The dataset including the response can include information for determining the predicted dialogue policy, the natural language response, or both based on the dataset.

As an example for illustration, the service can include a travel booking service, and the API query can request a booking action by an application associated with the booking service.

Generally, implementations can determine system tasks over a series of user actions. For example, methods can further include generating a system response based at least in part on the content embedding. The system response can include a natural language response which may be provided (e.g., using a speaker) to a user. Further aspects can include receiving a user response (e.g., a second user input) including natural language data that may be processed using a machine-learned natural language encoder to generate one or more response embeddings. Based at least in part on the one or more response embeddings, methods can update at least one of the one or more tasks such as the predicted dialogue state.

Aspects of updating the predicted dialogue state can include comparing the one or more goals determined based on the one or more response embeddings with the one or more goals determined based on the one or more content embeddings.

One non-limiting example of natural language embedders that can be used in example implementations include neural networks such as BERT. The neural networks can be configured to take two sequences (e.g., p and q) as input and, based on the input, the neural network can output an embedded sequence pair representation and/or token level representation. In general, the neural networks can include a variety of configurations including one or more hidden layers. Further the embedding can be generated from one of the hidden layers or from a combination of hidden layers produced by the neural network.

For example systems and methods according to the present disclosure, the systems may include or otherwise have access to a database including one or more schema sets each including at least one schema. Each schema set can be associated with one API of a plurality of APIs and each schema included in one of the schema sets can be associated with performing a respective service. In this manner, example implementations may define a hierarchy of actions such as first identifying a schema set associated with an API. Then identifying a schema within the schema set. Using this or a similar hierarchical organization, example methods may include filtering operations that can be included as part of obtaining the schema or one or more schema embeddings. For example, certain methods can further include identifying the service from a plurality of services based at least in part on the one or more user inputs.

Aspects of computing systems, devices, and methods according to the disclosure include natural language processing models. These models may be configured to access or receive input such as audio signals that can be received by a microphone included in the device or in communication with the device. While natural language descriptions are exemplified throughout using audio examples, embodiments according to the present disclosure are not limited solely to audio processing. Content embeddings or other embeddings may also be produced from user input in the form of text (e.g., by typing a request on an interface in communication with an example system). Further, example systems and methods can include operations for providing a response to a user. For example, output from a policy model or natural language generator may be provided to a speaker in communication with the system to output the natural language response as audio to a user.

With reference now to the Figures, example embodiments of the present disclosure will be discussed in further detail.

Example Devices and Systems

FIG. 1A depicts a block diagram of an example computing system 100 for performing task-oriented response generation according to example embodiments of the present disclosure. The system 100 can include a user computing device 102 and/or a server computing system 130 that for some implementations can be communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and memory 114. The one or more processors 112 can be, for example, any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the one or more processors 112 to cause the user computing device 102 to perform operations.

In some implementations, the user computing device 102 can store or access one or more dialogue state models 120. For example, the dialogue state models 120 can be or can otherwise include various natural language processing features such as voice to text, natural language encoders, or other similar methods for converting natural language to an embedded representation. The dialogue state models 120 can also include dialogue state predictors configured to determine probability distributions for assigning values to one or more inputs of a schema. Aspects of the schema can include natural language descriptions associated with each of the one or more inputs as well as possible values that some or all of the one or more inputs may be assigned.

In some implementations, the one or more dialogue state models 120 can be received from the server computing system 130 over network 180, stored in the user computing device memory 114, and then used or otherwise implemented by the one or more processors 112. In some implementations, the user computing device 102 can implement multiple parallel instances of a single dialogue state model 120 (e.g., to perform natural language processing and/or dialogue state prediction in parallel.) These use cases may provide advantages for processing large numbers of schema, for example, when a user computing device has access to a large number of applications each associated with different APIs.

More particularly, the dialogue state model 120 can function to perform operations such as processing natural language descriptions, determining a predicted dialogue state that can include assigning one or more values to possible schema inputs, determining an API query to an API associated with the schema, determining a predicted dialogue policy based on communication with a policy selector, and/or determining a natural language response based on communication with a natural language decoder.

As detailed above, for certain implementations, the dialogue state model 120 can include or be in communication with other models for performing instructions 118 included as part of the memory 114. Instructions 118 for other models may be executed to obtain application response data generated by providing the predicted dialogue state to an application using an associated API. Additionally or alternatively, the predicted dialogue state may be provided to a policy selector configured to determine possible operations in accordance with device and/or application actions. Additionally or alternatively, the predicted dialogue state may be provided to a natural language generator configured to decode a system response such as assigned input values to generate a natural language response that would be interpretable by a human. Further, while the predicted dialogue state may be provided to the natural language generator as system predictions using the dialogue state predictor, intermediate values such as embeddings produced by the natural language encoder may be provided in addition or in lieu of the predicted dialogue state.

The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 may include or is otherwise implemented by one or more server computing devices. In instances in which the server computing system 130 includes plural server computing devices, such server computing devices can operate according to sequential computing architectures, parallel computing architectures, or some combination thereof.

As described above for the user computing device 102, the server computing system 130 can store or otherwise include one or more dialogue state models 140. For example, the dialogue state models 140 can be or can otherwise include various natural language processing capability and machine-learned models.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system 100 that can be used to implement the present disclosure. Other computing systems 100 can be used as well. For example, in some implementations the user computing device 102 can include additional components such as a speaker and/or a display for providing a natural language response. The user computing device 102 may also include a microphone for receiving natural language input in the form of audio. The display or a keyboard in communication with the user computing device 102 may be used to transmit natural language input in the form of text.

Figure 1B:
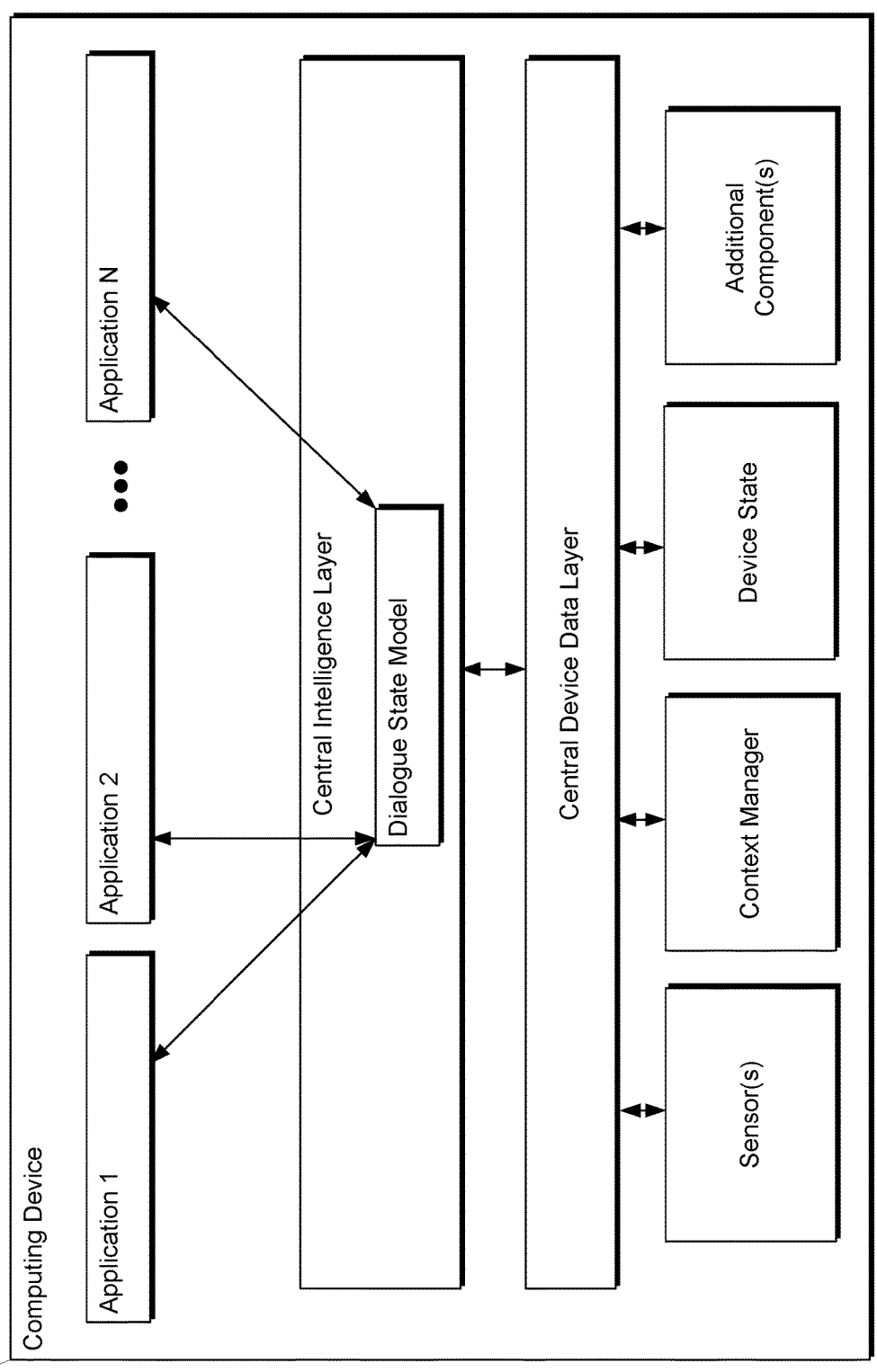
FIG. 1B depicts an example computing device including one or more applications in communication with a dialogue state model according to example implementations of the present disclosure.

As disclosed, the user computing device 102 and/or the server computing system 130 can include or have access to one or more computing devices 50 which can together include a number of applications (e.g., applications 1 through N). FIG. 1B depicts one example computing device 50. As shown, each application can contain include an application programming interface (API) for accessing one or more services performed by the application (e.g., flights, alarms, restaurants, media, hotels, ride sharing, rental services, movies, weather, music, homes, events banks, etc.) In general, each application can communicate with one or more other components of the computing device, such as, for example, one or more sensors, a context manager, a device state component, and/or additional components such as machine learned models or natural language encoders. In certain implementations, each application can communicate with each device component using a system API (e.g., a public API). In some implementations, the API used by each application is specific to that application. For instance, example implementations according to the present disclosure can each include an API for providing one or more services each associated with a schema. Each schema can include natural language descriptions of the service as well as natural language descriptions for one or more inputs used by the API to perform the service. The schema can also include values that may be associated with the one or more inputs. For instance, values for a flight service including can include airport codes, dates, number of stops, etc.

In general, each of these applications are in communication with a single dialogue state model, which can allow for improved communication between services. Further, the dialogue state model can interface with a central device layer to communicate model outputs to adjust the device state or provide context parameters such as device policies for data transmission or output. For instance, at certain points a device component such as a microphone may need to be activated to receive user input. Based on an output of the dialogue state model, the device may activate one or more additional components or sensor(s) to receive new user input such as natural language data. As another example, at certain points a device component such as a speaker may need to be activated to transmit audio data. Thus, aspects of implementations according to the present disclosure can include communication protocols for transmitting data by activating or deactivating certain features of an example computing device 50 based at least in part on output of the dialogue state model.

Figures 2, 3:
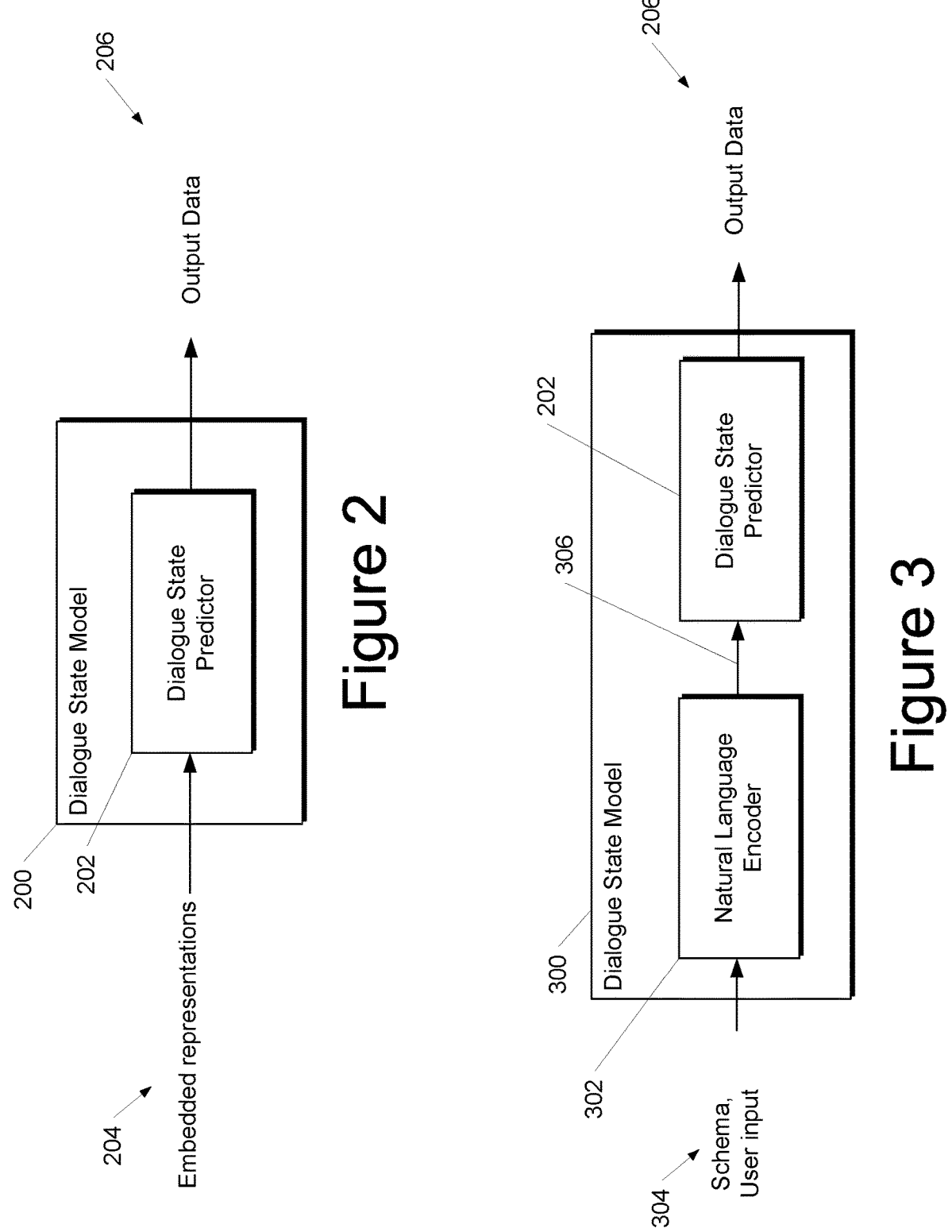
FIG. 2 depicts an example dialogue state model including a dialogue state predictor. The dialogue state model is shown receiving embedded representations to determine output data according to example implementations of the present disclosure.
FIG. 3 depicts another example dialogue state model including a natural language encoder and a dialogue state predictor according to example implementations of the present disclosure.

FIG. 2 depicts a block diagram of an example dialogue state model 200 according to the present disclosure. Aspects of the dialogue state model 200 can include a dialogue state predictor 202 configured to provide output data 206 based on the receipt of one or more embedded representations 204. Example embedded representations can include embeddings derived from natural language descriptions such as descriptions of schema elements and user inputs. The output data 206 can be in the form of computing system responses that can be provided to application APIs, device context managers and/or policy selectors, natural language generators, or other components to provide additional processing. Generally, dialogue state tracking is used to perform task-oriented response generation which may ultimately be provided in the form of a natural language response from a device including the dialogue state model 200 to a user. Aspects of example methods and systems include the ability to track dialogue state, thus output data 206 may represent updates to a previous dialogue state.

FIG. 3 depicts a block diagram of another example dialogue state model 300 according to the present disclosure. The dialogue state model 300 more explicitly demonstrates how natural language descriptions of schema and user input 304 may be obtained by a component of the dialogue state model 300 such as a natural language encoder 302 configured to generate an embedding based on receiving a natural language description. The output from the natural language encoder 302 including the embeddings are provided 306 to a dialogue state predictor 202 configured to perform similar operations as described in FIG. 2.

Together FIGS. 2 and 3 demonstrate that example dialogue state models 200 300 may include various configurations of components such as the natural language encoder 302 and the dialogue state predictor 202. Further these components may be stored separately on different devices that are in communication with one another or may be included on the same device as part of a single model configured to perform sequential processing of example inputs.

Figure 4:
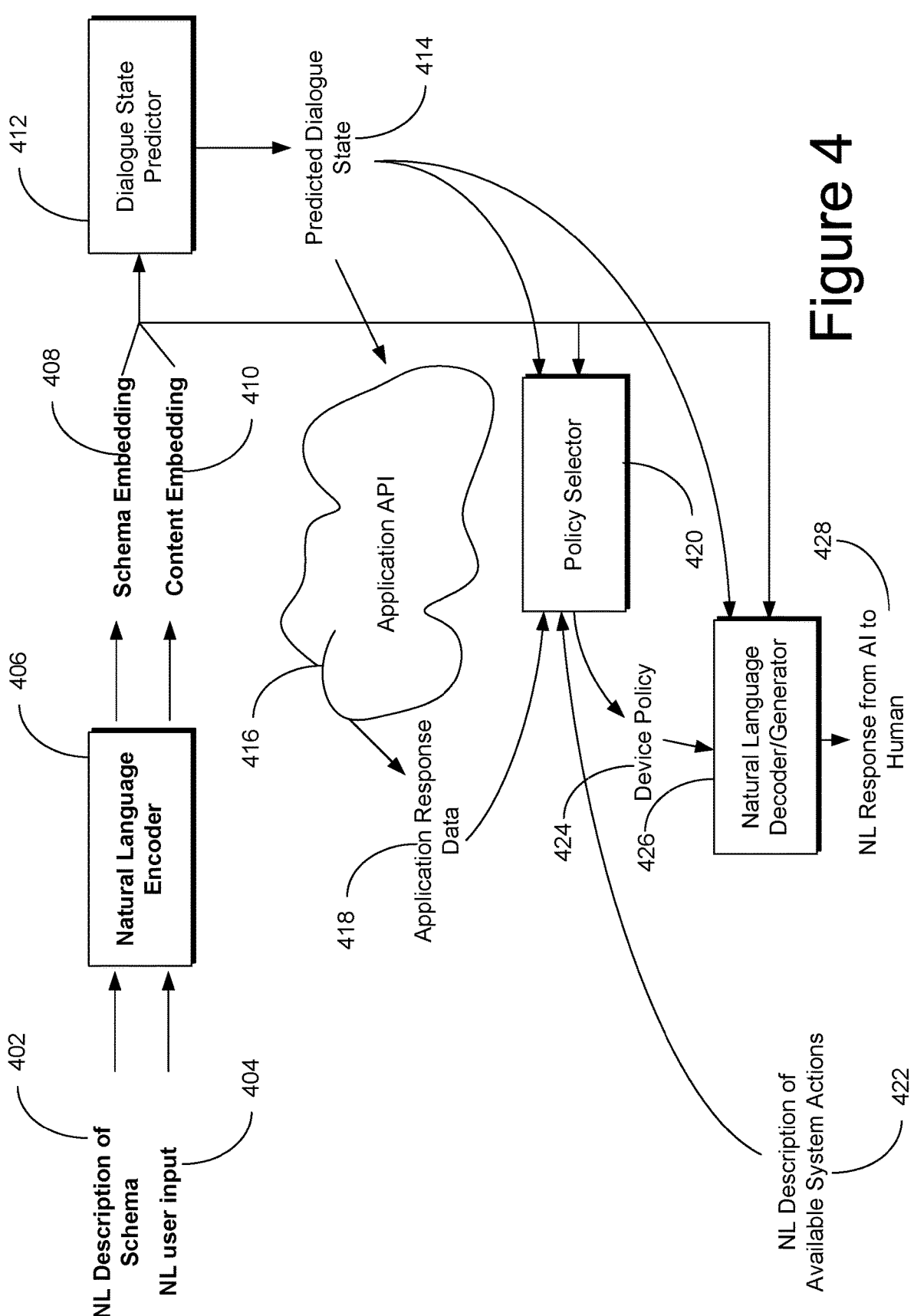
FIG. 4 depicts an example process flow diagram illustrating an example process for determining output such as a predicted dialogue state, application response data, or a NL response from AI to human according to example implementations of the present disclosure.

FIG. 4 displays an example process flow diagram of an example method for determining response generation according to example implementations of the present disclosure. In particular, FIG. 4 displays inputs including a natural language (NL) description of a schema 402 and natural language (NL) description of a user input 404 provided to a natural language encoder 406 to produce a schema embedding 408 and content embedding 410, respectively.

Based at least on the pair of these inputs, a dialogue state predictor 412 can generate a predicted dialogue state 414. The predicted dialogue state 414 can include information related to preforming a service such as assigning values to inputs for performing a service associated with an application API 416.

The application API 416 can process information, such as included as part of the predicted dialogue state 414. In certain implementations, the application API 416 may generate, based at least in part on the predicted dialogue state 414, a response including application response data 418. Application response data 418 may be provided to a policy selector 420 in combination with one or more of natural language (NL) descriptions of available system actions 422, the predicted dialogue state 414 and/or the schema embedding 408 and content embedding 410 to determine a device policy 424 indicative of allowable actions as well as descriptions of allowable actions that the device may perform.

A natural language encoder/generator 426 may be used to process the device policy 424 from the policy selector 420 and/or based on the predicted dialogue state 414 to generate a natural language (NL) response from the device (AI) to a human 428. Thus, implementations according to the present disclosure may be used to generate responses to human prompts that can be communicated by an artificial intelligence (AI) system.

Example Methods

FIG. 5 depicts a flow chart diagram of an example method for generating training data according to example embodiments of the present disclosure. Although FIG. 5 depicts steps performed in a particular order for purposes of illustration and discussion, methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a natural language description of a schema comprising one or more inputs to an application programming interface (API) associated with performing a service. For implementations according to the present disclosure, obtaining the natural language description can include accessing local or remote data storage such as local memory, traditional databases, cloud databases, or other similar components which include information descriptive of the schema.

At 504, the computing system can process the natural language description of the schema using a machine-learned natural language encoder to obtain one or more schema embeddings. Example natural language encoders can include pre-trained neural networks such as BERT.

At 506, the computing system can obtain natural language data descriptive of textual content that comprises one or more user inputs. Generally, implementations can include or be in communication components such as microphones, keyboards, touch screens, or other similar components for receiving a user input. The user input can be in the form of natural language (e.g., speech) that can be recorded by the system and stored for later processing or processed without storing.

At 508, the computing system can process the natural language data using the machine-learned natural language encoder to obtain one or more content embeddings. Similarly to processing the natural language description of the schema, example natural language encoders can include pre-trained neural networks such as BERT. Further, the same natural language encoder may be used to generate the one or more content embeddings as the natural language encoder used to generate the schema embeddings.

At 510, the computing system can determine, based at least in part on the one or more schema embeddings and based at least in part on the one or more content embeddings, one or more tasks from the group: a predicted dialogue state, an API query to the API associated with the service, a predicted dialogue policy, and a natural language response to the one or more user inputs.

As an example for illustration, for certain implementations the at least one task can include generating the predicted dialogue state. Aspects of the predicted dialogue state can include a user intent defining one or more goals, each of the one or more goals is associated with at least one input of the schema used to generate the schema embedding. The user intent can also include data descriptive of a probability distribution including values for performing at least the service or a null service. In some implementations, the user intent may also include data descriptive of a second service associated with the same schema or a second schema.

In general, a machine-learned model can be trained to determine the probability distribution (e.g., using supervised or unsupervised, or a combination of training methods). The machine-learned model can be configured to take as input one schema embedding and one content embedding pair. In certain implementations, the machine-learned model may be configured to determine predictions for at least one additional schema that an example system may have access to (e.g., for comparison to the schema). For instance, the machine learned model may be configured to receive as input one schema embedding and one content embedding pair or one second schema embedding and one content embedding pair, or both pairs of embeddings.

Example Dialogue State Output

Figure 6:
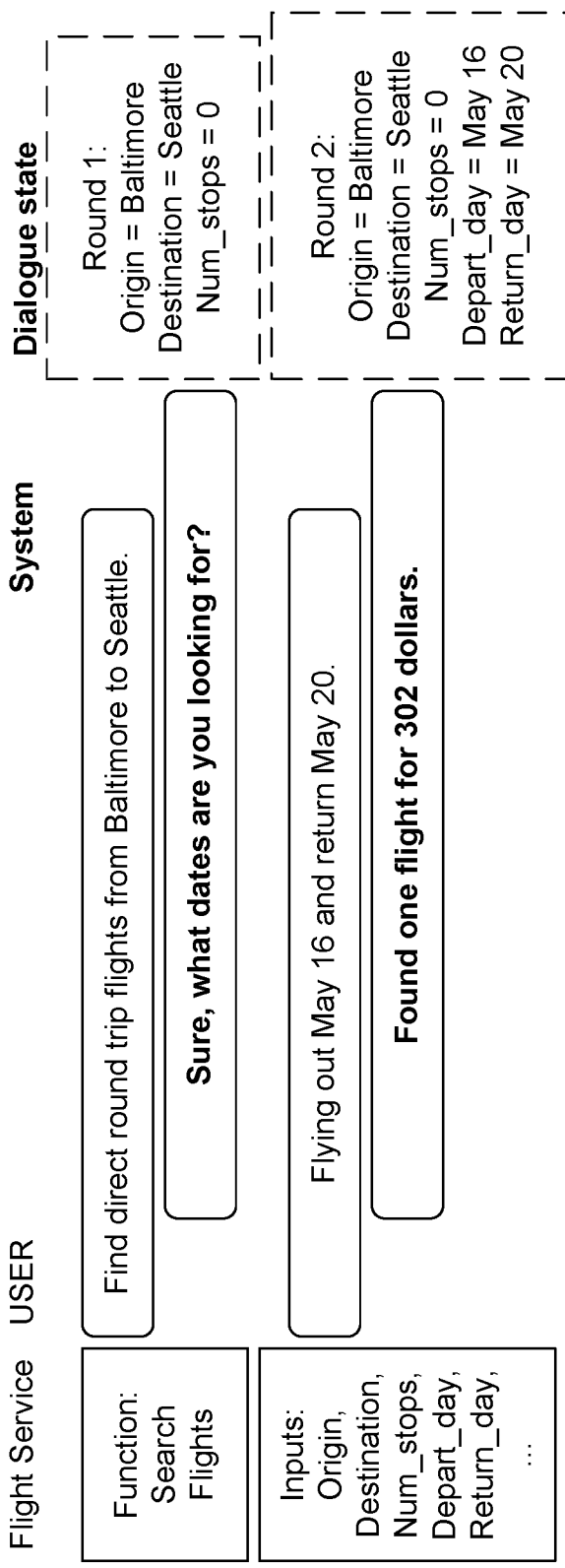
FIG. 6 depicts an example user-system dialogue generated according to example implementations of the present disclosure.

FIG. 6 depicts an example dialogue between a user and an example computing system including a dialogue state model according to example implementations of the present disclosure. For instance, a user may prompt the example system "Find direct round trip flights from Baltimore to Seattle." In response the dialogue model may identify an application including a service/function for searching flights. The function may include a schema having inputs such as origin, destination, number of stops (num_stops), departure date, return date, etc. Based on natural language descriptions associated with these inputs as well as possible values, the system can determine a dialogue state including assigning values to some or all of the inputs (e.g., in the first round of dialogue the computing system can predict the origin, destination, and number of stops). Based on the current dialogue state, the API associated with the schema may indicate that further information is needed to generate a successful query. This information can be used to generate a natural language response from the system to the user such as "sure, what dates are you looking for?" In the second round, the user may provide additional data in the form of a second user prompt such as "flying out May 16 and return May 20." This information can be used to update the dialogue state including the predicting additional values for inputs while other inputs are left unchanged. Based on this information the system may provide a response such as "found one flight for 302 dollars."

Example Dialogue State Model Configuration Using Example Schema

As an example for illustrative purposes, one implementation in accordance with the present disclosure can include a single model shared among all services and domains. In using a single model, predictions can be conditioned on pertinent API's schemas using descriptions of intents and inputs. Particularly, the model can be robust to unseen inputs from new APIs or when a change is made to an existing API. Using sufficiently trained natural language encoders such as ELMo (Peters et al. 2019) and BERT (Devlin et al. 2019) can provide one mechanism for providing such flexibility. However, these encoders still need to be coupled with a dialogue state predictor that is configured to understand a broad variety of domains using natural language descriptions tied to schema elements associated with the API inputs.

One such model is described in further detail in the following example. For each application, the dialogue state tracking model can be configured to predict the active intent parameter, the requested inputs parameter, and the user goal parameter. The model also includes a natural language encoder for obtaining the embedded representations of the schema and the user prompt.

For the purpose of illustration, an example schema can include a two-sequence format as displayed in Table 1. Table 1 includes several elements, an application for performing one or more services, inputs for performing one or more services for the application, and values for certain inputs. Each of these elements can be related through two sequences as shown. The sequences can be used to define relationships such as services related to the application or which an application can perform by an API call, inputs related to services or which are required to perform the API call by the service, and values that can be taken for certain inputs. Generally, each of these elements are provided in the form of natural language descriptions that can be provided to a trained natural language encoder.

TABLE 1

Example schema including example input
sequences for a natural language encoder.

| | Sequence 1 | Sequence 2 |
|---|---|---|
| Application | Service descriptions | Application description |
| Input | Service descriptions | Input descriptions |
| Value | Input descriptions | values |

Figure 1C:
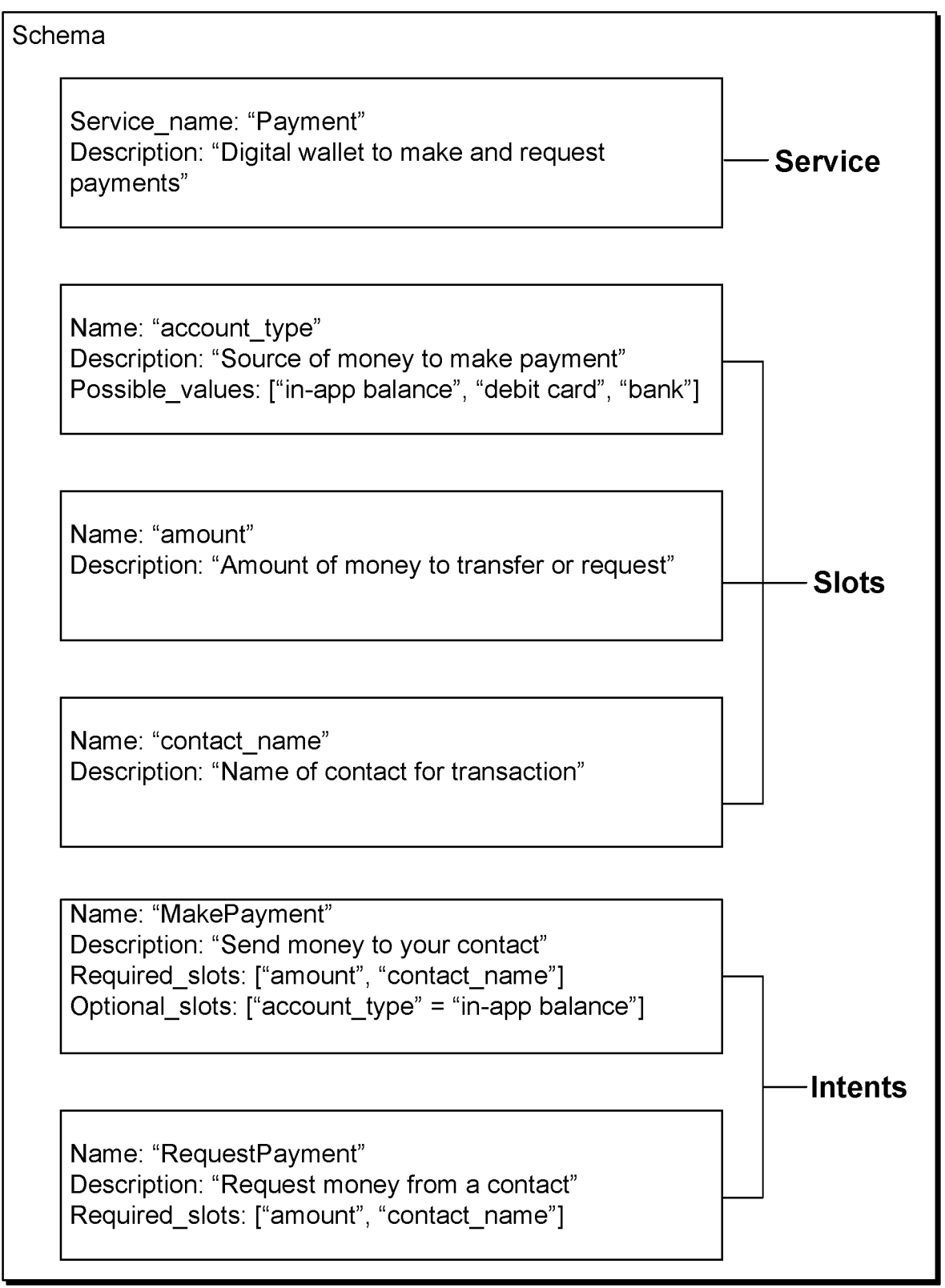
FIG. 1C depicts an example aspect of example implementations according to the present disclosure showing an example schema

FIG. 1C displays another representation of an example schema. The example schema depicts a service or application that can include a name and description. The schema also depicts one or more intents which each include a natural language description and a set of required slots (e.g., inputs) that can be used to execute the intent. The schema further depicts one or more slots which include natural language descriptions, a name, and may also include values that can be taken by the slot. While illustrated as possible values, it should be understood that the descriptions shown are provided to demonstrate an example configuration and that variations may be used depending on the service. Further one example advantage of implementations according to the present disclosure includes the ability for example systems and methods to handle various schema that can have varying numbers of slots/inputs and intents based on the inclusion of a natural language description.

Figure 7:
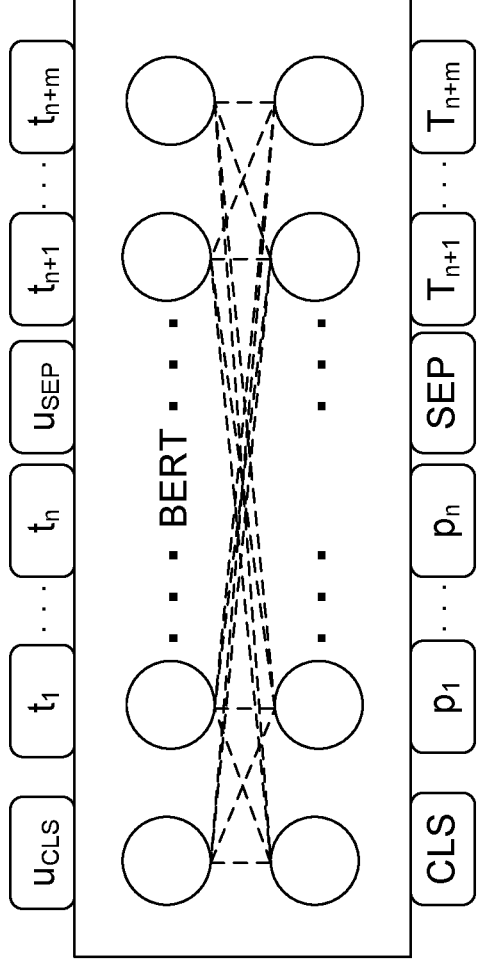
FIG. 7 depicts an example structure of an example encoder model, BERT, for use in certain implementations according to the present disclosure.

As illustrated in FIG. 7, a BERT natural language encoder can take two sequences p and q as input and output an embedded sequence pair representation $u_{CLS}$ and token level representations $\{t_1 \ldots t_{n+m}\}$. The BERT encoder can be used to obtain schema element embeddings and encode user prompts for dialogue state tracking.

In generating the schema embedding, the BERT model can obtain embedded representations of services, inputs, and categorical input values in each schema. For instance, the sequences shown in Table 1 can be fed to a pretrained BERT encoder and the output $u_{CLS}$ used as the schema embedding.

For a given application defined with I services and S inputs, let $\{i_j\}$, $1 \leq j \leq I$ and $\{s_j\}$, $1 \leq j \leq S$ be the embeddings of all services and inputs respectively. As a special case, let $$\{s_j^n\},$$

$1 \leq j \leq N \leq S$ denote the embeddings for the N non-categorical inputs in the service. Also, let $$\{v_j^k\},$$

$1 \leq j \leq V^k$ denote the embeddings for all possible values taken by the kth categorical input, $1 \leq k \leq C$. All of these embeddings can be collectively referred to as schema embeddings.

Utterance Encoding

Like (Chao and Lane 2019), a BERT encoder as depicted in FIG. 7 can be used to encode the user utterance and the preceding system utterance to obtain utterance pair embedding $u=u_{CLS}$ and token level representations $t_1; t_2 \ldots t_M$, M being the total number of tokens in the user and system utterances. The utterance and schema embeddings are used together to obtain model predictions using a set of projections that can be defined as below.

Projection

Let $x, y \in \mathbb{R}^d$. For a task T, the model can define $1 = F_T(x,y,k)$ as a projection transforming x and y into the vector $1 \in \mathbb{R}^k$ using Equations 1-3. Here, $h_1; h_2 \in \mathbb{R}^d$, $W_i^T$ and $b_i^T$ for $1 \leq i \leq 3$ are trainable parameters of suitable dimensions and A is the activation function. An activation function such as gelu (Hendrycks and Gimpel 2016) activation as in BERT may be used as part of the projection task.

$$h_1 = A(W_1^T + b_1^T) \tag{1}$$

$$h_1 = A(W_2^T(yy \oplus h_1 1) + b_2^T) \tag{2}$$

$$1 = W_1^T h_2 + b_3^T \tag{3}$$

Active Service

For a given service, the active intent denotes the intent currently being processed by the system. It takes the value "NONE" if no intent for the service is currently being processed. Let i0 be a trainable parameter in Rd for the "NONE" intent. We define the intent network as below.

$$l_j = f_{intent}(u; i_j; 1),\ 1 \le j \le I \tag{4}$$

The logits $l_j$ are normalized using softmax to yield a distribution over all I service plus the "NONE" service. During inference, we predict the highest probability intent as active.

Requested Inputs

Projection $F_{req}$ predicts logit $l_j$ for the $j^{th}$ requested slot. Obtained logits for all requested inputs are normalized using sigmoid to get a score in [0; 1]. During inference, all inputs with score >0:5 are predicted as requested.

$$l_j = F_{req}(u; s_j; 1);\ 1 \le j \le I \tag{5}$$

User Goal

Instead of predicting the entire user goal after each user utterance, the model may predict the difference between the user goal for the current turn and preceding user turn. During inference, the predicted user goal updates are accumulated to yield the predicted user goal. We predict the user goal updates in two stages. First, for each slot, a distribution of size 3 denoting the slot status and taking values none, dontcare and active is obtained by normalizing the logits obtained in equation 6 using softmax. If the status of a slot is predicted to be none, its assigned value is assumed to be unchanged. If the prediction is dontcare, then the special dontcare value is assigned to it. Otherwise, a slot value is predicted and assigned to it in the second stage.

$$1_{status}^j = \mathcal{F}_{status}(u; s_j; 3);\ 1 \le j \le S \tag{6}$$

$$1_{value}^{j,k} = \mathcal{F}_{value}(u; v_j^k; 1);\ 1 \le j \le V^k,\ 1 \le k \le C \tag{7}$$

$$1_{vstart}^{j,k} = \mathcal{F}_{start}(t_k; s_j^n; 1);\ 1 \le j \le N,\ 1 \le k \le M \tag{8}$$

$$1_{end}^{j,k} = \mathcal{F}_{end}(t_k; s_j^n; 1);\ 1 \le j \le N,\ 1 \le k \le M \tag{9}$$

In the second stage, equation 7 is used to obtain a logit for each value taken by each categorical input. Logits for a given categorical input are normalized using softmax to get a distribution over all possible values. The value with the maximum mass is assigned to the input. For each non-categorical input, logits obtained using equations 8 and 9 are normalized using softmax to yield two distributions over all tokens. These two distributions respectively correspond to the start and end index of the span corresponding to the input. The indices i≤j maximizing start[i]+end[j] are predicted to be the span boundary and the corresponding value is assigned to the input.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
   providing, by a computing system comprising one or more computing devices, a natural language description of a schema associated with an application programming interface (API), wherein the schema includes one or more inputs to the API associated with performing a service and the natural language description includes information descriptive of the schema including a description of the one or more inputs to the API and a description of one or more functions of the service;
   processing, as a first input to a machine-learned natural language encoder, the natural language description of the schema to generate one or more schema embeddings based on the natural language description of the schema;
   providing, by the computing system, natural language data generated based on one or more user prompts indicating an intent of the user;
   processing, as a second input to the machine-learned natural language encoder, the natural language data to generate one or more content embeddings based on the natural language data; and
   determining, by the computing system based on one or more of the schema embeddings or the one or more content embeddings, a natural language response to the one or more user prompts.

2. The computer-implemented method of claim 1, wherein the method is performed by a virtual assistant software agent.

3. The computer-implemented method of claim 1, further comprising:
   providing, by the computing system, a second natural language description of a second schema associated with a second API, wherein the second schema includes one or more second inputs to the second API associated with performing a second service and the second natural language description includes information descriptive of the second schema including a description of the one or more second inputs to the second API and a description of one or more functions of the second service; and
   processing, as a third input to the machine-learned natural language encoder, the second natural language description of the second schema to generate one or more second schema embeddings based on the second natural language description of the second schema.

4. The computer-implemented method of claim 3, further comprising determining, by the computing system based on the one or more schema embeddings, the one or more second schema embeddings, and the one or more content embeddings, a predicted dialogue state.

5. The computer-implemented method of claim 4, wherein the predicted dialogue state comprises a user intent defining one or more goals, and wherein each of the one or more goals is associated with at least one input of the schema.

6. The computer-implemented method of claim 5, wherein the user intent comprises a probability distribution including values for performing at least the service, the second service, or a null service, and wherein the probability distribution is determined by a machine-learned model configured to generate a prediction based on receiving an input comprising one schema embedding and one content embedding pair or one second schema embedding and one content embedding pair, or both.

7. The computer-implemented method of claim 6, further comprising generating, by the computing system based on the one or more schema embeddings, the one or more second schema embeddings, and the one or more content embeddings, an API query to the API associated with the service or an API query to the second API associated with the second service, based on the predicted dialogue state.

8. The computer-implemented method of claim 7, further comprising:

submitting the API query to the API associated with the service or the second API associated with the second service;

receiving a dataset comprising a response from the API associated with the service or a response from the second API associated with the second service; and generating a predicted dialogue policy, the natural language response, or both based on the dataset.

9. The computer implemented method of claim 8, wherein the service comprises a booking service, and wherein the API query requests a booking action by an application associated with the booking service.

10. The computer implemented method of claim 1, further comprising:

receiving, by the computing system, a user response comprising additional natural language data;

processing, by the machine-learned natural language encoder, the user response comprising the additional natural language data, to generate one or more response embeddings; and updating, by the computing system and based on the one or more response embeddings, the natural language response to the one or more user prompts.

11. The computer implemented method of claim 10, further comprising determining, by the computing system based on the one or more schema embeddings and based on the one or more content embeddings, a predicted dialogue state comprising a user intent defining one or more goals, and wherein each of the one or more goals is associated with at least one input of the schema.

12. The computer implemented method of claim 11, further comprising updating, by the computing system and based on the one or more response embeddings, the predicted dialogue state by comparing one or more goals determined based on the one or more response embeddings with the one or more goals determined based on the one or more schema embeddings and based on the one or more content embeddings.

13. The computer-implemented method of claim 1, wherein the machine-learned natural language encoder comprises a BERT natural language encoder.

14. The computer-implemented method of claim 1, wherein the computing system comprises a database of one or more schema sets, each of the schema sets associated with one API of a plurality of APIs, and wherein each of the one or more schema sets is associated with performing a respective service.

15. The method of claim 1, further comprising:

identifying, by the computing system, the service from a plurality of potential services based on the one or more user prompts.

16. A computing system, comprising:

one or more processors; and one or more non-transitory computer-readable media that collectively store instructions that, when executed by the one or more processors cause the computing system to perform operations, the operations comprising:

providing a natural language description of a schema associated with an application programming interface (API), wherein the schema includes one or more inputs to the API associated with performing a service and the natural language description includes information descriptive of the schema including a description of the one or more inputs to the API and a description of one or more functions of the service;

processing, as a first input to a machine-learned natural language encoder, the natural language description of the schema to generate one or more schema embeddings based on the natural language description of the schema;

providing natural language data generated based on one or more user prompts indicating an intent of the user;

processing, as a second input to the machine-learned natural language encoder, the natural language data to generate one or more content embeddings based on the natural language data; and determining, based on one or more of the schema embeddings or the one or more content embeddings, a natural language response to the one or more user prompts.

17. The computing system of claim 16, further comprising:

a microphone configured to receive audio signals, and a speaker configured to provide an audio signal;

wherein the operations further include: providing, by the speaker, an audio signal comprising the natural language response to the one or more user prompts.

18. The computing system of claim 16, wherein providing the natural language description of the schema comprises retrieving the natural language description of the schema upon detection that the service is requested.

19. One or more non-transitory computer-readable media that store instructions that, when executed by one or more processors, cause the one or more processors to perform operations, the operations comprising:

providing a natural language description of a schema associated with an application programming interface (API), wherein the schema includes one or more inputs to the API associated with performing a service and the natural language description includes information descriptive of the schema including a description of the one or more inputs to the API and a description of one or more functions of the service;

processing, as a first input to a machine-learned natural language encoder, the natural language description of the schema to generate one or more schema embeddings based on the natural language description of the schema;

providing natural language data generated based on one or more user prompts indicating an intent of the user;

processing, as a second input to the machine-learned
natural language encoder, the natural language data to
generate one or more content embeddings based on the
natural language data; and determining, based on one or more of the schema embeddings or the one or more content embeddings, a natural
language response to the one or more user prompts.

20. The one or more non-transitory computer-readable
media of claim 19, wherein the operations further include
determining, based on the one or more schema embeddings
and the one or more content embeddings, a predicted dialogue state, wherein the predicted dialogue state comprises
a user intent defining one or more goals, and wherein each
of the one or more goals is associated with at least one input
of the schema.

* * * * *